United States Patent
Lee et al.

(10) Patent No.: US 9,122,024 B2
(45) Date of Patent: Sep. 1, 2015

(54) BIDIRECTIONAL OPTICAL TRANSMITTING AND RECEIVING DEVICE

(75) Inventors: Jong Jin Lee, Gwangju (KR); Kwon-Seob Lim, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 360 days.

(21) Appl. No.: 13/552,015

(22) Filed: Jul. 18, 2012

(65) Prior Publication Data

US 2013/0071126 A1    Mar. 21, 2013

(30) Foreign Application Priority Data

Sep. 21, 2011  (KR) .................. 10-2011-0095221

(51) Int. Cl.
   *H04B 10/00*  (2013.01)
   *G02B 6/42*   (2006.01)

(52) U.S. Cl.
   CPC .................... *G02B 6/4201* (2013.01)

(58) Field of Classification Search
   CPC .................................................. G02B 6/4021
   See application file for complete search history.

(56) References Cited

U.S. PATENT DOCUMENTS

| | | | |
|---|---|---|---|
| 5,555,127 A * | 9/1996 | Abdelkader et al. | 359/341.1 |
| 6,999,323 B1 * | 2/2006 | Aronson et al. | 361/753 |
| 7,093,988 B2 | 8/2006 | Tsumori | |
| 7,142,740 B2 | 11/2006 | Lee et al. | |
| 7,476,037 B2 * | 1/2009 | Golwalkar et al. | 385/89 |
| 8,005,367 B2 * | 8/2011 | Nakanishi et al. | 398/138 |
| 8,265,486 B2 * | 9/2012 | Lim et al. | 398/135 |
| 8,380,075 B2 * | 2/2013 | Sakigawa et al. | 398/138 |
| 8,608,390 B2 * | 12/2013 | Saitou | 385/92 |
| 8,644,712 B2 * | 2/2014 | Chan et al. | 398/138 |
| 2002/0005347 A1 * | 1/2002 | Sferlazzo et al. | 204/192.1 |
| 2002/0030872 A1 * | 3/2002 | Dair et al. | 359/152 |
| 2002/0126456 A1 * | 9/2002 | Sato et al. | 361/728 |
| 2003/0020986 A1 * | 1/2003 | Pang et al. | 359/152 |
| 2004/0071413 A1 * | 4/2004 | Tsumori | 385/93 |
| 2004/0146304 A1 * | 7/2004 | Kuhara et al. | 398/138 |
| 2005/0121684 A1 * | 6/2005 | Aruga et al. | 257/99 |
| 2005/0208789 A1 * | 9/2005 | Shirai et al. | 439/66 |
| 2006/0110104 A1 * | 5/2006 | Sakai | 385/33 |
| 2007/0071444 A1 * | 3/2007 | Okada et al. | 398/135 |
| 2008/0044135 A1 * | 2/2008 | Furuichi et al. | 385/34 |

(Continued)

FOREIGN PATENT DOCUMENTS

| | | |
|---|---|---|
| JP | 2004-20973 | 1/2004 |
| JP | 2008-177310 | 7/2008 |

(Continued)

*Primary Examiner* — Ken Vanderpuye
*Assistant Examiner* — Amritbir Sandhu
(74) *Attorney, Agent, or Firm* — Rabin & Berdo, P.C.

(57) ABSTRACT

Disclosed is a bidirectional light transmitting and receiving device which includes a first conductive plate; a second conductive plate; at least one first lead pin which penetrates the first conductive plate and includes a first conductor and a first dielectric surrounding the first conductor; at least one second lead pin which penetrates the second conductive plate and includes a second conductor and a second dielectric surrounding the second conductor; a light receiving unit which is connected with the at least one first lead pin; and a light transmitting unit which is connected with the at least one second lead pin, wherein the first conductive plate is electrically isolated from the second conductive plate.

14 Claims, 6 Drawing Sheets

(56) References Cited

U.S. PATENT DOCUMENTS

| | | | |
|---|---|---|---|
| 2011/0044696 A1* | 2/2011 | Lim et al. | 398/139 |
| 2012/0128290 A1* | 5/2012 | Han et al. | 385/14 |
| 2013/0071126 A1* | 3/2013 | Lee et al. | 398/135 |
| 2013/0195441 A1* | 8/2013 | Lee et al. | 398/9 |
| 2013/0272665 A1* | 10/2013 | Lim et al. | 385/92 |
| 2014/0061451 A1* | 3/2014 | Park et al. | 250/227.11 |

FOREIGN PATENT DOCUMENTS

| | | |
|---|---|---|
| JP | 2011-150082 | 8/2011 |
| KR | 10-0982018 | 9/2010 |

* cited by examiner

BIDIRECTIONAL OPTICAL TRANSMITTING AND RECEIVING DEVICE

CROSS-REFERENCE TO RELATED APPLICATIONS

A claim for priority under 35 U.S.C. §119 is made to Korean Patent Application No. 10-2011-0095221 filed Sep. 21, 2011, in the Korean Intellectual Property Office, the entire contents of which are hereby incorporated by reference.

BACKGROUND

The inventive concepts described herein relate to a bidirectional optical transmitting and receiving device.

Optical communication may be a high-capacity communication technology. With the optical communication, a transmission signal may be converted into an optical signal at a transmitter side, and the converted optical signal may be transmitted via a medium such as an optical fiber. The optical signal may be converted into an original signal at a receiver side.

A bidirectional optical transmitting and receiving device transmitting and receiving optical signals via one optical fiber may be used to reduce the surcharge such as an installed charge and a rental fee of the optical fiber. The bidirectional optical transmitting and receiving device may be configured such that no interference between a transmitted optical signal and a received optical signal is generated. The optical transmitter and the optical receiver may be fabricated to have an airtight structure.

SUMMARY

One aspect of embodiments of the inventive concept is directed to provide a bidirectional light transmitting and receiving device which comprises a first conductive plate; a second conductive plate; at least one first lead pin which penetrates the first conductive plate and includes a first conductor and a first dielectric surrounding the first conductor; at least one second lead pin which penetrates the second conductive plate and includes a second conductor and a second dielectric surrounding the second conductor; a light receiving unit which is connected with the at least one first lead pin; and a light transmitting unit which is connected with the at least one second lead pin, wherein the first conductive plate is electrically isolated from the second conductive plate.

In example embodiments, the bidirectional light transmitting and receiving device further comprises an insulator coupled with an upper surface of the first conductive plate, wherein the second conductive plate is coupled with an upper surface of the insulator.

In example embodiments, the second conductive plate is extended in a direction perpendicular to the upper surface of the first conductive plate to form a side wall.

In example embodiments, the insulator is provided at a border of the upper surface of the first conductive plate and exposes the upper surface of the first conductive plate.

In example embodiments, the bidirectional light transmitting and receiving device further comprises a substrate coupled with the upper surface of the second conductive plate and covering an exposed upper surface of the first conductive plate, wherein the light transmitting unit is formed on the substrate and the light receiving unit is formed at a space between the substrate and the first conductive plate.

In example embodiments, a hole is provided at the substrate to expose a part of the upper surface of the first conductive plate.

In example embodiments, the bidirectional light transmitting and receiving device further comprises a light emitting element which emits a light in response to a signal transmitted through the at least one second lead pin; a light receiving element which converts an input light into an electrical signal; a pre-amplifier which amplifies the electrical signal from the light receiving element to output the amplified signal through the first lead pin; a first lens which collimates a light emitted from the light emitting element; a second lens which contacts with the exterior; a third lens which focuses an input light to be induced to the light receiving element; and a filter which passes a light from the first lens to the second lens and reflects a light passing through the second lens to the third lens.

In example embodiments, the light emitting element is the light transmitting unit and the light receiving element and the pre-amplifier form the light receiving unit.

In example embodiments, the bidirectional light transmitting and receiving device further comprises a monitor element which is provided on the substrate in a direction opposite to the first direction from the light emitting element and monitors a light emitted from the light emitting element.

In example embodiments, the at least one first lead pin forms at least one coaxial cable with the first conductive plate and the first conductive plate acts as a ground of the at least one coaxial cable.

In example embodiments, the at least one second lead pin forms at least one coaxial cable with the second conductive plate and the second conductive plate acts as a ground of the at least one coaxial cable.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
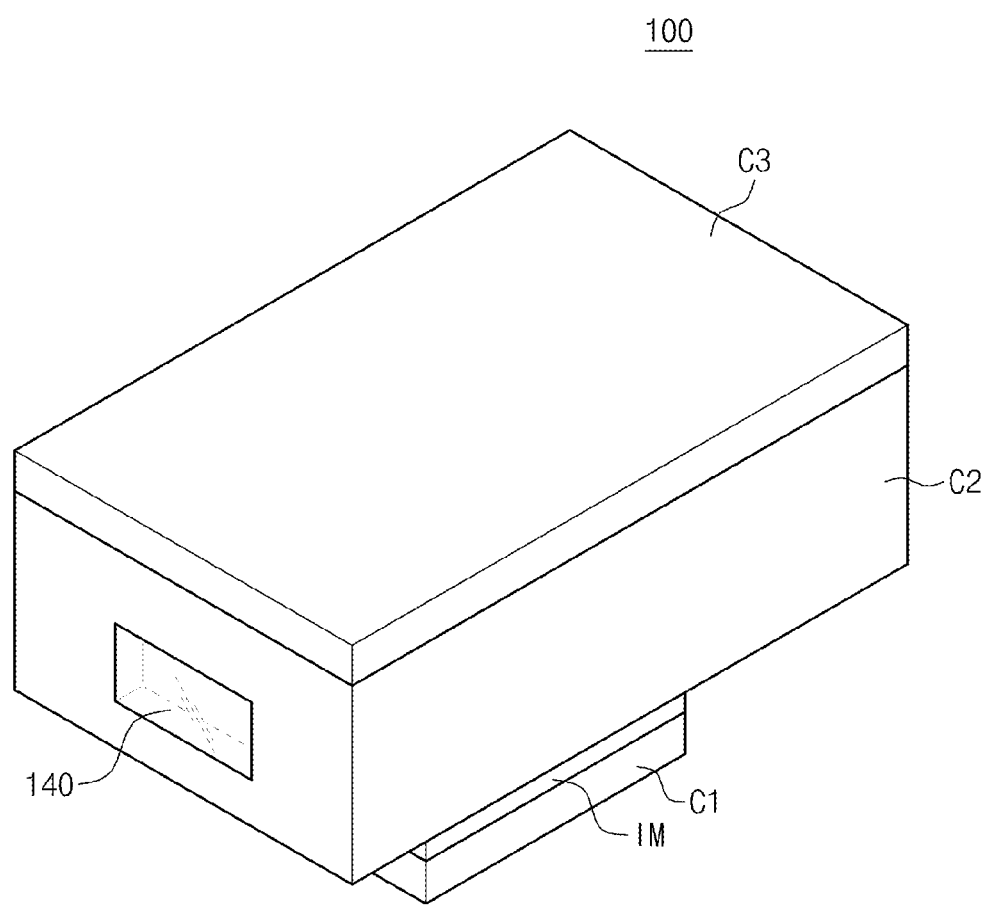
FIG. 1 is an upward perspective view of a bidirectional optical transmitting and receiving device according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 2:
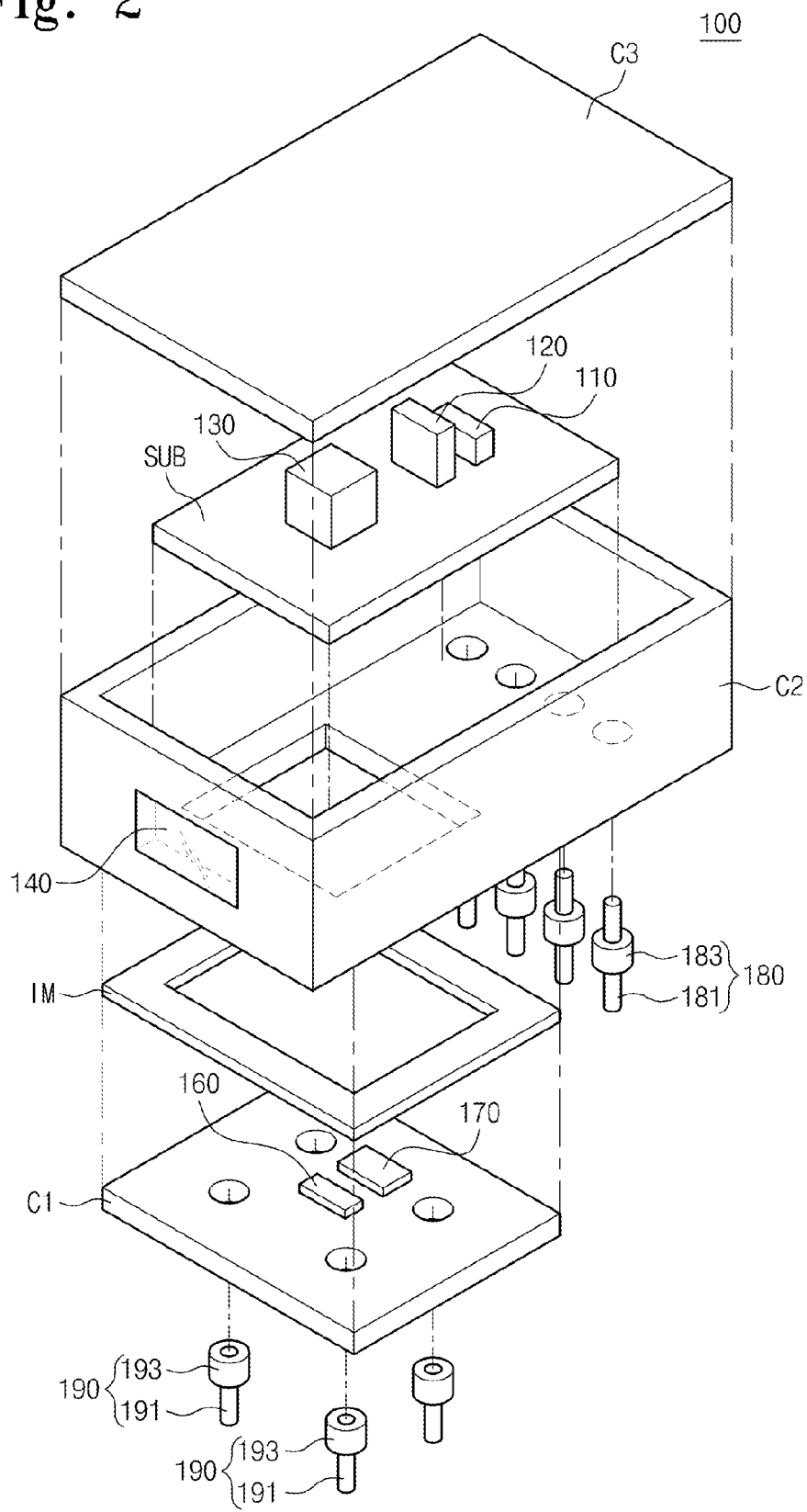
FIG. 2 is an explored perspective view of a bidirectional optical transmitting and receiving device according to an embodiment of the inventive concept.
Figure 3:
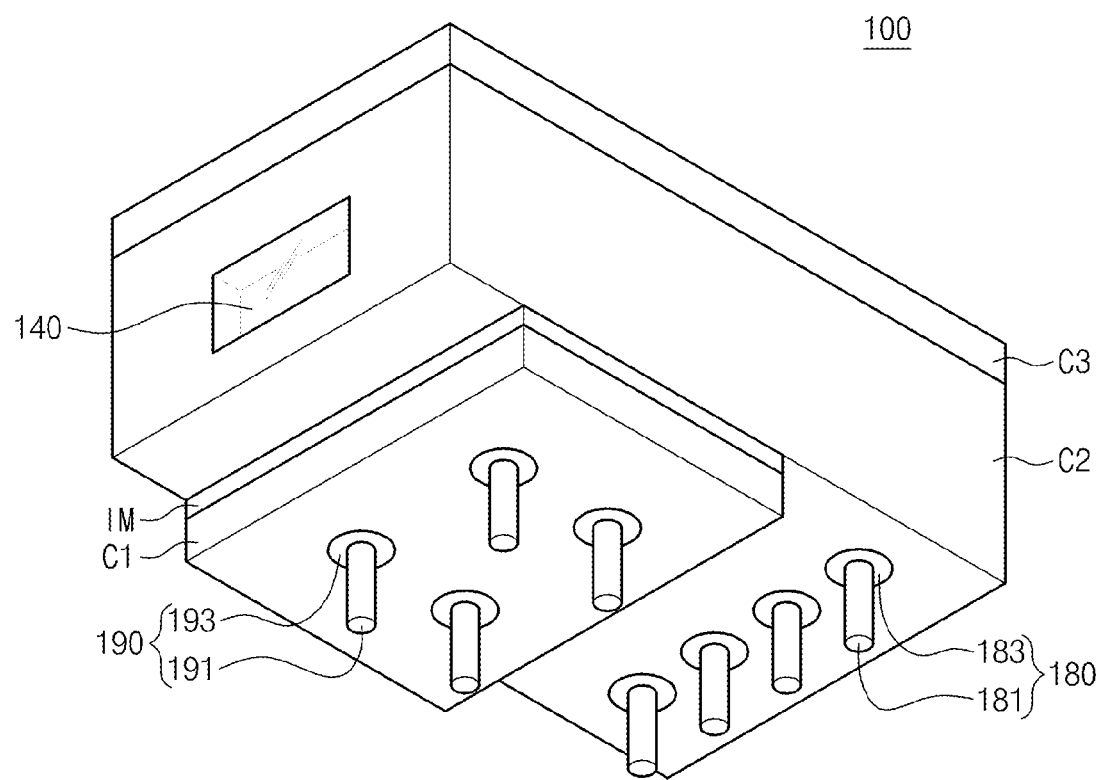
FIG. 3 is a downward perspective view of a bidirectional optical transmitting and receiving device according to an embodiment of the inventive concept.
Figure 4:
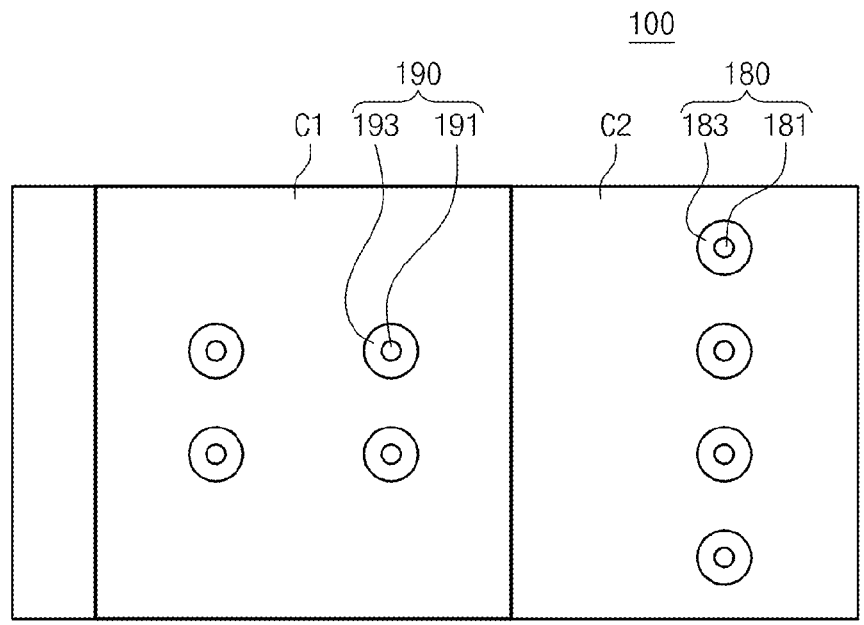
FIG. 4 is a diagram illustrating a lower surface of a bidirectional optical transmitting and receiving device according to an embodiment of the inventive concept.
Figure 5:
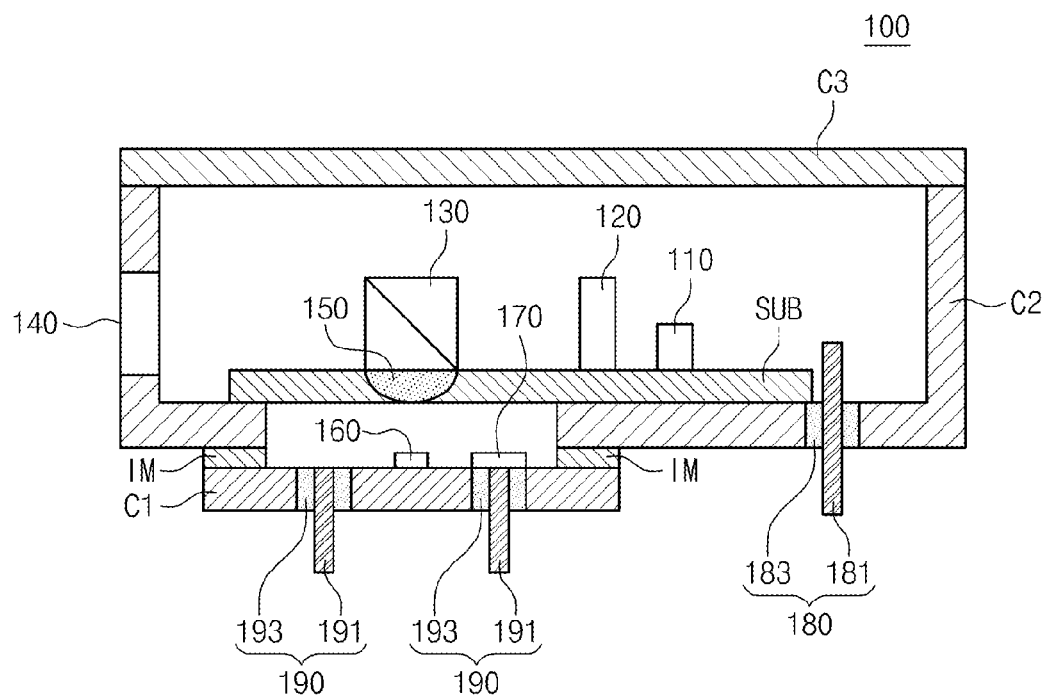
FIG. 5 is a cross-sectional view of a bidirectional optical transmitting and receiving device according to an embodiment of the inventive concept.

FIG. 1 is an upward perspective view of a bidirectional optical transmitting and receiving device according to an embodiment of the inventive concept. FIG. 2 is an explored perspective view of a bidirectional optical transmitting and receiving device according to an embodiment of the inventive concept. FIG. 3 is a downward perspective view of a bidirectional optical transmitting and receiving device according to an embodiment of the inventive concept. FIG. 4 is a diagram illustrating a lower surface of a bidirectional optical transmitting and receiving device according to an embodiment of the inventive concept. FIG. 5 is a cross-sectional view of a bidirectional optical transmitting and receiving device according to an embodiment of the inventive concept.

Referring to FIGS. 1 to 5, a first conductive plate C1 may be provided. A plurality of lead pins 190 may be provided which is configured to penetrate the conductive plate C1 and includes a conductor 191 and a dielectric 193 surrounding the conductor 191. The plurality of lead pins 190 may be a plurality of lead pins for reception. The plurality of lead pins 190 may be used as a plurality of coaxial cables with the first conductive plate C1. For example, the first conductive plate C1 may be used as a common ground of the plurality of coaxial cables. In FIGS. 1 to 5, there may be illustrated the case that four lead pins 190 penetrating the first conductive plate C1 are provided. However, the inventive concept is not limited thereto.

A light receiving element 160 and a pre-amplifier 170 may be provided on the first conductive plate C1. The light receiving element 160 may convert an input light into an electrical signal. The pre-amplifier 170 may amplify an electrical signal output from the light receiving element 160 to output it to the plurality of lead pins 190.

An insulator IM may be provided on an upper surface of the first conductive plate C1, in detail, along a border of an upper surface of the first conductive plate C1. The insulator IM may be formed to have a hollow pipe shape, and may expose the upper surface of the first conductive plate P1, that is, the light receiving element 160 and the pre-amplifier 170.

A second conductive plate C2 may be coupled with an upper surface of the insulator IM. The second conductive plate C2 may be extended along a plane parallel with the first conductive plate C1 from the upper surface of the insulator IM. The second conductive plate C2 may not be provided a region corresponding to the interior of a pipe shape formed by the insulator IM. The second conductive plate C2 may expose the upper surface of the first conductive plate C1 exposed by the insulator IM, that is, the light receiving element 160 and the pre-amplifier 170. The second conductive plate C2 may be extended in a direction perpendicular to the upper surface of the first conductive plate C1 to form an outer wall of the bidirectional light transmitting and receiving device 100.

A plurality of lead pins 180 may be provided which penetrates the second conductive plate C2 and is formed of a conductor 181 and a dielectric 183 surrounding the conductor 181, respectively. The plurality of lead pins 180 may be a plurality of lead pins for transmission. The plurality of lead pins 180 may be used as a plurality of coaxial cables with the second conductive plate C2. For example, the second conductive plate C2 may be used as a common ground of the plurality of coaxial cables. In FIGS. 1 to 5, there may be illustrated the case that four lead pins 180 penetrating the second conductive plate C2 are provided. However, the inventive concept is not limited thereto.

A substrate SUB may be coupled with an upper surface of the second conductive plate C2 (an upper surface of a bottom portion excepting a side wall). The substrate SUB may be extended into a region of the first conductive plate C1 exposed by the insulator IM and the second conductive plate C2 from the upper surface of the second conductive plate C2. That is, the substrate SUB may cover a region of the first conductive plate C1 exposed by the insulator IM and the second conductive plate C2. The substrate SUB may include an insulating material. The substrate SUB may include a light blocking material. The substrate SUB may separate a light receiving unit and a light transmitting unit of the bidirectional light transmitting and receiving device 100.

A light emitting element 110, a first lens 120, and a filter 130 may be provided on the substrate SUB. A third lens 150 may be provided under the filter 130 to penetrate the substrate SUB. A hole may be provided at the substrate SUB to expose a part of the upper surface of the first conductive plate C1, and the third lens 150 may be provided at the hole. The filter 130, the third lens 150, and the light receiving element 160 may be disposed to be located on the same line.

A second lens 140 may be provided to penetrate a side wall formed by the second conductive plate C2. The second lens 140 may contact with inner and outer spaces of the bidirectional light transmitting and receiving device 100 through the side wall formed by the second conductive plate C2. The light emitting element 110, the first lens 120, the filter 130, and the second lens 140 may be disposed to be located on the same line.

An insulating case C3 may be coupled on the side wall formed by the second conductive plate C2. The insulating case C3 may include an insulating material.

The first conductive plate C1, the insulator IM, the second conductive plate C2, the insulating case C3, the second lens 140, and the lead pins 180 and 190 may seal internal elements of the bidirectional light transmitting and receiving device 100 to become airtight.

The light emitting element 110 may be a light transmitting unit. The light receiving element 160 and the pre-amplifier 170 may form a light receiving unit. The first lens 120, the filter 130, the second lens 140, and the third lens 150 may form a light control unit controlling a light transfer path.

Figure 6:
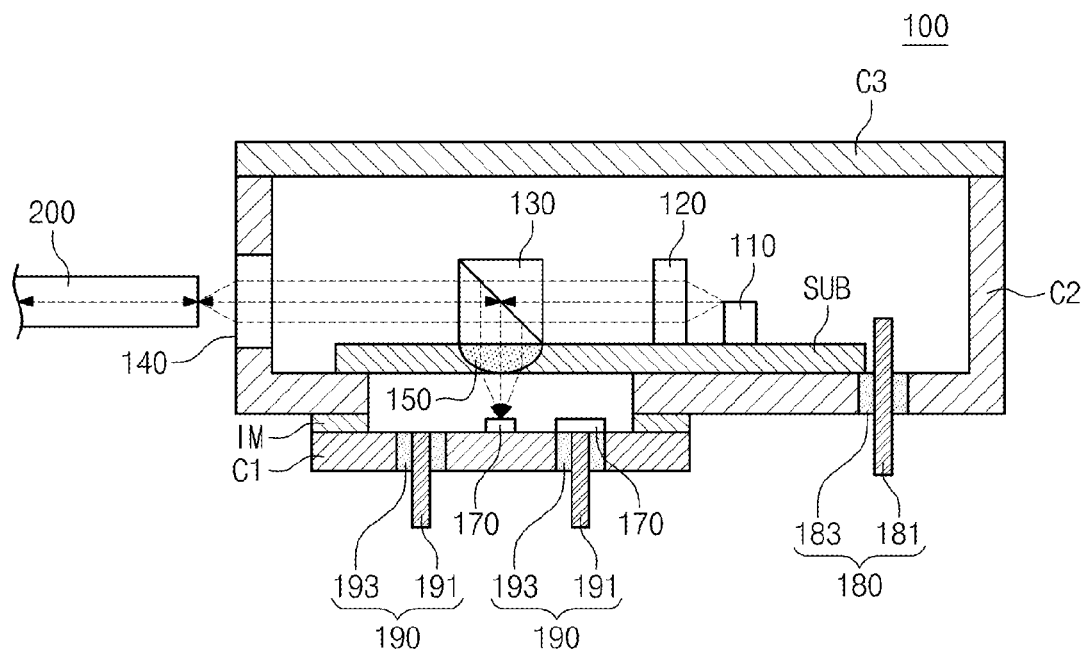
FIG. 6 is a diagram illustrating a light transmitting and receiving operation of a bidirectional light transmitting and receiving device.

FIG. 6 is a diagram illustrating a light transmitting and receiving operation of a bidirectional light transmitting and receiving device. Referring to FIG. 6, a first electrical signal may be received through lead pins 180. The first electrical signal may be a transmission signal to be sent through a bidirectional light transmitting and receiving device 100. A light emitting element 110 may emit light in response to the first electrical signal received through the lead pins 180. The light emitting element 110 may emit light in a first direction.

A first lens 120 may collimate a light emitted from the light emitting element 110. The first lens 120 may refract a light emitted from the light emitting element 110 to generate a first collimated light. The first collimated light may be induced to a filter 130 along the first direction.

The filter 130 may have selective penetrability and selective reflex. The filter 130 may pass a light having a first frequency band, and may reflect a light having a second frequency band. A pass band of the filter 130 may correspond to a frequency of a light emitted from the light emitting element 110. That is, the filter 130 may pass a light transferred from the light emitting element 110 through the first lens 120. A light passing through the filter 130 may be induced to a second lens 140 along the first direction.

The second lens 140 may focus a light incident from the filter 130 to be induced to an optical fiber 200. That is, the first electrical signal supplied to the bidirectional light transmitting and receiving device 100 through the lead pins 180 may be converted into a light by the light emitting element 110, controlled through the first lens 120, the filter 130, and the second lens 140, and output to the optical fiber 200.

A light transferred to the bidirectional light transmitting and receiving device 100 through the optical fiber 200 may be incident onto the second lens 140. The second lens 140 may convert a light input from the optical fiber 200 into a second collimated light. The second lens 140 may output the second collimated light by refracting a light input from the optical fiber 200. The second collimated light may be induced to the filter 130 along a direction opposite to the first direction.

A reflecting band of the filter 130 may correspond to a frequency of a light emitted from the optical fiber 200. That is, the filter 130 may reflect a light incident from the optical fiber 200 through the second lens 140. The filter 130 may reflect an incident light to the third lens 150.

The third lens 150 may focus a light reflected from the filter 130 to be induced to a light receiving element 160. The light receiving element 160 may convert a light input from the third lens 150 into a second electrical signal. A pre-amplifier 170 may amplify the second electrical signal output from the light receiving element 160 to output it to lead pins 190. That is, a light transmitted to the bidirectional light transmitting and receiving device 100 from the optical fiber 200 may be controlled by the second lens 140, the filter 130, and the third lens 150, converted into the second electrical signal by the light receiving element 160, and amplified by the pre-amplifier 170. The amplified signal may be output to the outside.

Data to be transmitted through the bidirectional light transmitting and receiving device 100 may be transferred to the bidirectional light transmitting and receiving device 100 through the lead pins 180. Data provided to the bidirectional light transmitting and receiving device 100 may be output to the outside through the lead pins 190. The lead pins 190 may act as coaxial cables which use a first conductive plate C1 as a common ground. The lead pins 180 may act as coaxial cables which use a second conductive plate C2 as a common ground. Thus, the bidirectional light transmitting and receiving device 100 may exchange data with an external device in high speed through the lead pins 180 and 190. The second conductive plate C2 used as a common ground of the lead pins 180 for transmission and the first conductive plate C1 used as a common ground of the lead pins 190 for reception may be electrically isolated from each other. Thus, it is possible to prevent interference between a transmitting unit and a receiving unit of the bidirectional light transmitting and receiving device 100 due to the lead pins 180 and 190.

Figure 7:
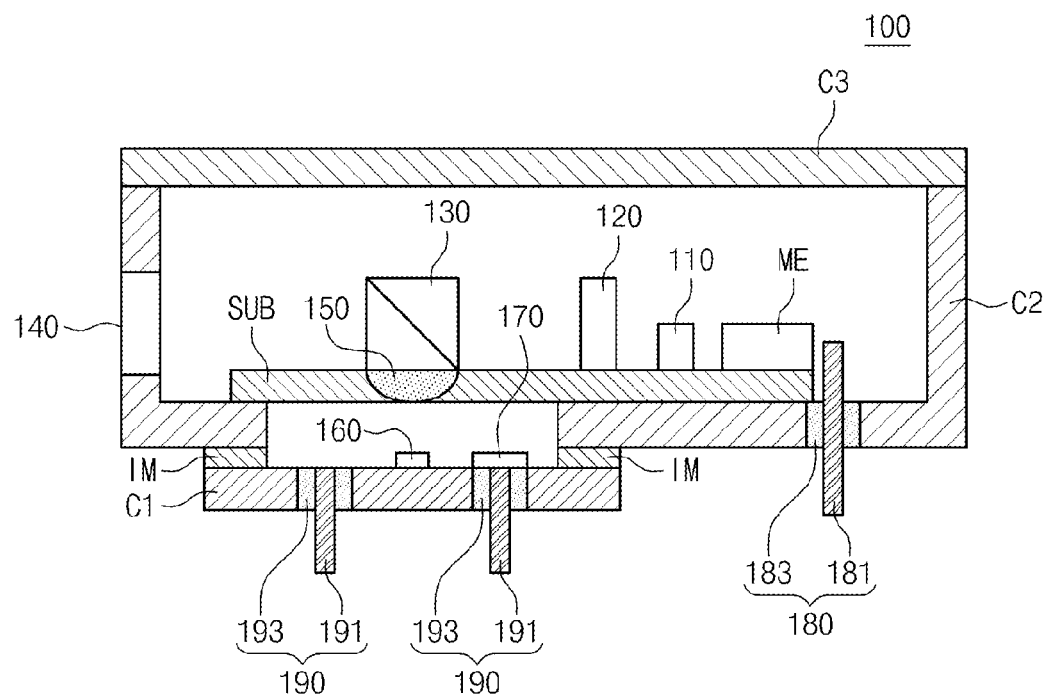
FIG. 7 is a diagram illustrating a bidirectional light transmitting and receiving device according to another embodiment of the inventive concept.

FIG. 7 is a diagram illustrating a bidirectional light transmitting and receiving device according to another embodiment of the inventive concept. A bidirectional light transmitting and receiving device 100a in FIG. 7 may be equal to that in FIG. 1 except that a monitor element ME is added. The monitor element ME may be a light receiving element which receives a light emitted from a light emitting element 110 and converts the input light into an electrical signal. The monitor element ME may output information associated with a light emitted from m the light emitting element 110 through lead pins 180 to the outside by an electrical signal manner.

Figure 8:
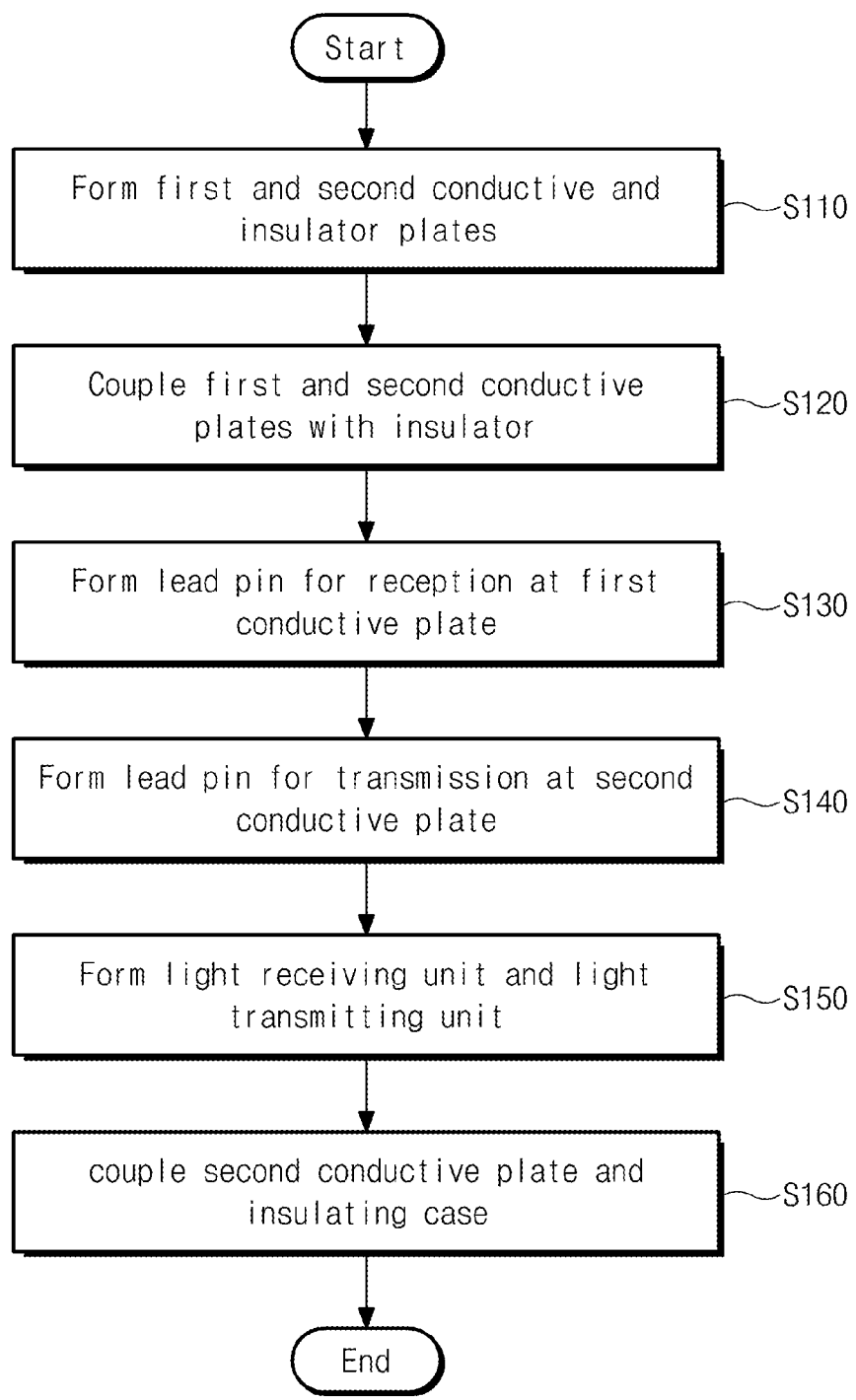
FIG. 8 is a flowchart illustrating a fabricating method of a bidirectional light transmitting and receiving device according to another embodiment of the inventive concept.

FIG. 8 is a flowchart illustrating a fabricating method of a bidirectional light transmitting and receiving device according to another embodiment of the inventive concept. Referring to FIGS. 1 to 8, in step S110, a first conductive plate C1, a second conductive plate C2, and an insulator IM may be formed.

In step S120, the first conductive plate C1 and the second conductive plate C2 may be coupled through the insulator IM.

In step S130, lead pins 190 for reception may be formed at the first conductive plate C1. Each of the lead pins 190 for reception may penetrate the first conductive plate C1 and be formed of a conductor 191 and a dielectric 193 surrounding the conductor 191.

In step S140, lead pins 180 for transmission may be formed at the second conductive plate C2. Each of the lead pins 180 for transmission may penetrate the second conductive plate C2 and be formed of a conductor 181 and a dielectric 183 surrounding the conductor 181.

In step S150, a light receiving unit and a light transmitting unit may be formed. As the light receiving unit, a light receiving element 180 and a pre-amplifier 190 may be formed on the first conductive plate C1. A substrate SUB may be formed on the second conductive plate C2. As the light transmitting unit, a light emitting element 110 may be formed on the substrate SUB. A first lens 120, a filter 130, a second lens 140, and a third lens 130 may be formed as a light control unit.

In step S160, the second conductive plate C2 may be coupled with an insulating case C3. The first conductive plate C1, the insulator IM, the second conductive plate C2, the insulating case C3, the second lens 140, and the lead pins 180 and 190 may seal internal elements of the bidirectional light transmitting and receiving device 100 to become airtight.

As described above, lead pins 180 for transmission may act as a coaxial cable with a second conductive plate C2, and lead pins 190 for reception may act as a coaxial cable with a first conductive plate C1. Thus, it is possible to transmit data through the lead pins 180 for transmission and the lead pins 190 for reception in high speed. The second conductive plate C2 used as a common ground of the lead pins 180 for transmission and the first conductive plate C1 used as a common ground of the lead pins 190 for reception may be electrically isolated from each other. Thus, it is possible to prevent interference between a transmitting unit and a receiving unit of the bidirectional light transmitting and receiving device 100 due to the lead pins 180 and 190.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A bidirectional light transmitting and receiving device, comprising:
    a first conductive plate;
    a second conductive plate electrically isolated from the first conductive plate;
    at least one first lead pin which penetrates the first conductive plate, the at least one first lead pin including a first conductor and a first dielectric surrounding the first conductor, the first conductor and the first dielectric penetrating the first conductive plate;
    at least one second lead pin which penetrates the second conductive plate, the at least one second lead pin including a second conductor and a second dielectric surrounding the second conductor, the second conductor and the second dielectric penetrating the second conductive plate;
    a light receiving unit which is connected with the at least one first lead pin;
    a light transmitting unit which is connected with the at least one second lead pin,
    a single filter both
        passing a light to a single optical transmission element from the light transmitting unit, and
        passing a light to the light receiving unit from the single optical transmission element;
    an insulator coupled with an upper surface of the first conductive plate, wherein the second conductive plate is coupled with an upper surface of the insulator;
    a conductive sidewall surrounding the light receiving unit, the light transmitting unit and the single filter; and
    a conductive top surface directly coupled to top surfaces of the conductive sidewall on the light receiving unit, the light transmitting unit and the single filter,
    wherein the second conductive plate is directly coupled to a bottom surface of the conductive sidewall below the light transmitting unit and forms a first part of the bottom surface, and
    wherein the first conductive plate is coupled to the second conductive plate through insulating materials of the insulator below the light receiving unit and forms a second part of the bottom surface.

2. The bidirectional light transmitting and receiving device of claim 1, wherein the insulator is provided at a border of the upper surface of the first conductive plate and exposes a part of the upper surface of the first conductive plate.

3. The bidirectional light transmitting and receiving device of claim 1, further comprising:
    a substrate coupled with an upper surface of the second conductive plate and covering an exposed upper surface of the first conductive plate,
    wherein the light transmitting unit is formed on the substrate and the light receiving unit is formed at a space between the substrate and the first conductive plate.

4. The bidirectional light transmitting and receiving device of claim 3, wherein a hole is provided at the substrate to expose a part of the upper surface of the first conductive plate.

5. The bidirectional light transmitting and receiving device of claim 1, further comprising:
    a light emitting element which emits a light in response to a signal transmitted through the at least one second lead pin;
    a light receiving element which converts an input light into an electrical signal;
    a pre-amplifier which receives and amplifies the electrical signal from the light receiving element, and outputs the amplified electrical signal through the at least one first lead pin;
    a first lens which collimates the light emitted from the light emitting element;
    a second lens which contacts with an exterior of the bidirectional light transmitting and receiving device and coupled with the optical transmission element; and
    a third lens which focuses light to form the input light and transmits the input light to the light receiving element,
    wherein the single filter passes a light from the first lens to the second lens and reflects a light passing from the second lens to the third lens.

6. The bidirectional light transmitting and receiving device of claim 5, wherein the light emitting element is the light transmitting unit, and further wherein the light receiving element and the pre-amplifier form the light receiving unit.

7. The bidirectional light transmitting and receiving device of claim 5, further comprising:
a substrate; and
a monitor element provided on the substrate opposite the light emitting element, the monitor element monitoring a light emitted from the light emitting element.

8. The bidirectional light transmitting and receiving device of claim 1, wherein
the at least one first lead pin forms at least one coaxial cable with the first conductive plate, and
the first conductive plate acts as a ground of the at least one coaxial cable.

9. The bidirectional light transmitting and receiving device of claim 1, wherein
the at least one second lead pin forms at least one coaxial cable with the second conductive plate, and
the second conductive plate acts as a ground of the at least one coaxial cable.

10. The bidirectional light transmitting and receiving device of claim 1, wherein:
the light transmitting unit comprises a light emitting element which emits a light in response to a signal transmitted through the at least one second lead pin;
the light receiving unit comprises:
a light receiving element which converts an input light into an electrical signal; and
a pre-amplifier which receives and amplifies the electrical signal from the light receiving element, and outputs the amplified electrical signal through the at least one first lead pin;
the bidirectional light transmitting and receiving device further comprises:
a first lens which collimates the light emitted from the light emitting element;
a second lens which contacts with an exterior of the bidirectional light transmitting and receiving device; and
a third lens which focuses light to form the input light and transmits the input light to the light receiving element,
the single filter passes a light from the first lens to the second lens and reflects a light passing from the second lens to the third lens.

11. The bidirectional light transmitting and receiving device of claim 1, further comprising a single second lens which contacts with an exterior of the bidirectional light transmitting and receiving device, the single second lens focusing light from the light transmitting unit and collimating light to be transmitted to the light receiving unit.

12. The bidirectional light transmitting and receiving device of claim 11, wherein the light transmitting unit, the single filter and the single second lens are disposed in that stated order on a single straight line.

13. The bidirectional light transmitting and receiving device of claim 1, further comprising:
a substrate disposed on the second conductive plate, the light transmitting unit being supported by the substrate so that the substrate is between and separates the light transmitting unit and the light receiving unit, the substrate including a hole; and
a third lens disposed in the hole and that focuses light onto the light receiving unit.

14. The bidirectional light transmitting and receiving device of claim 13, wherein the light receiving unit, the third lens and the single filter are disposed on that stated order on a single straight line.

* * * * *